D. C. WATT & F. A. GREARSON.
VEHICLE TOP RAISING AND LOWERING MECHANISM.
APPLICATION FILED NOV. 10, 1913.
1,144,925.
Patented June 29, 1915.
5 SHEETS—SHEET 1.
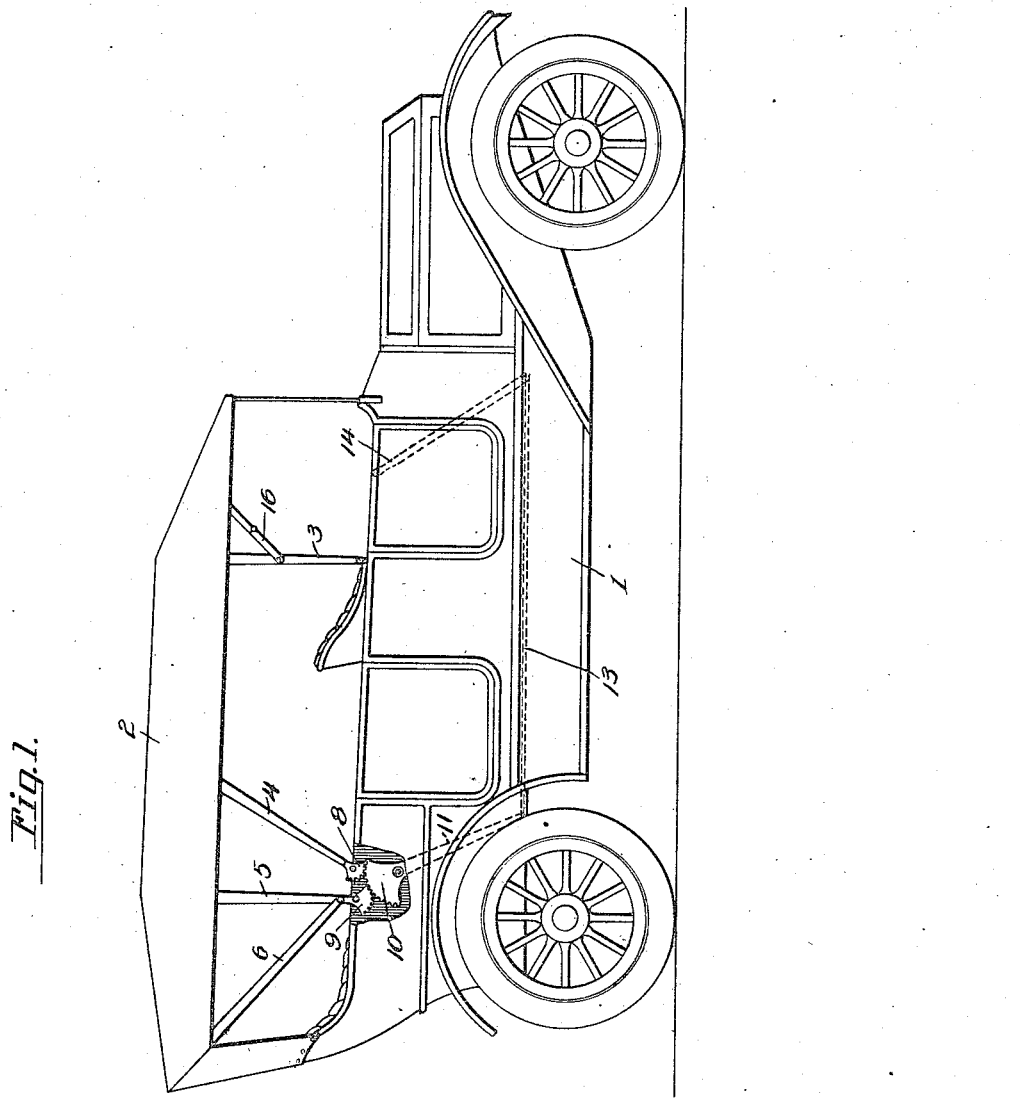

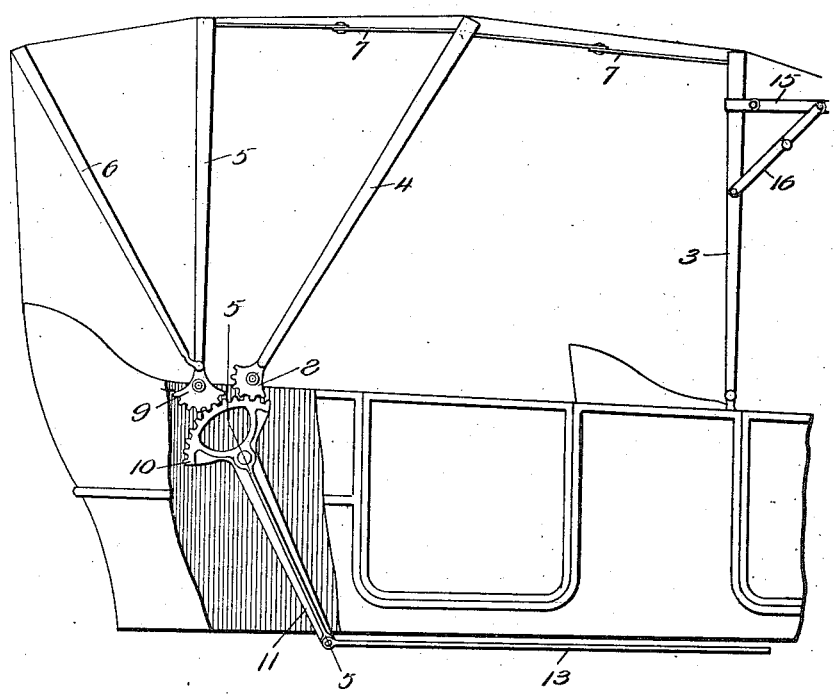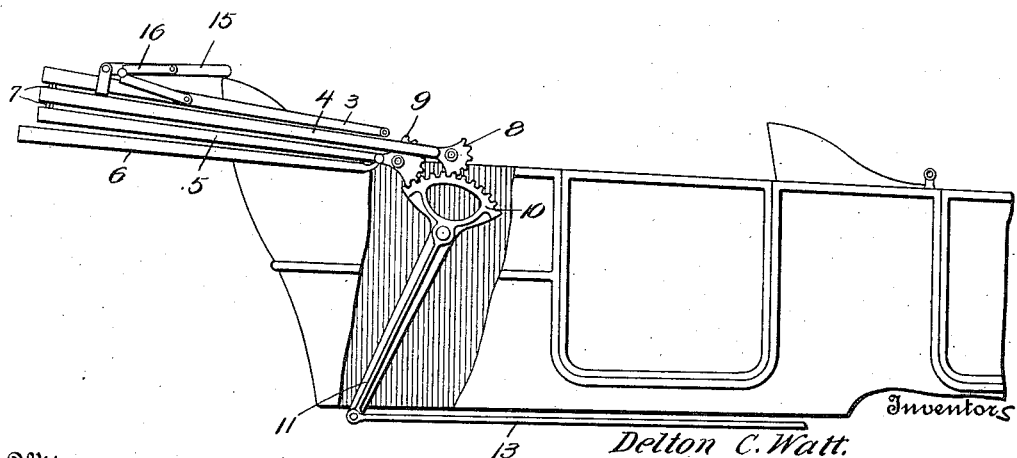

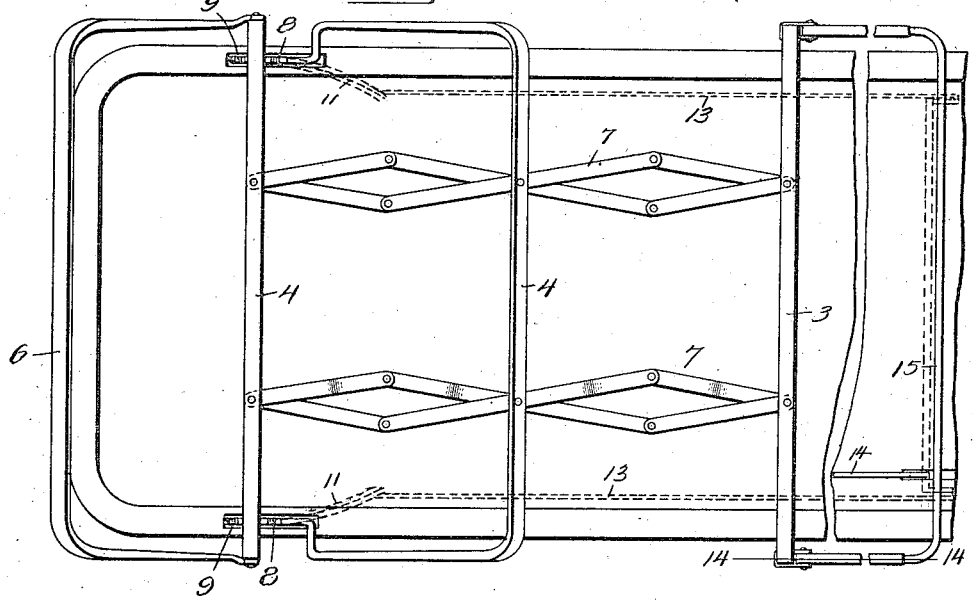
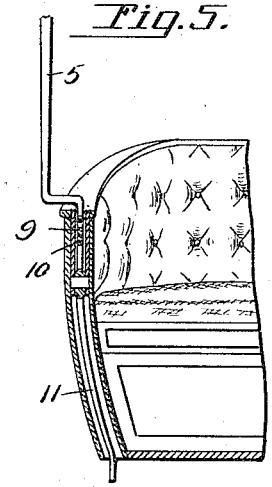
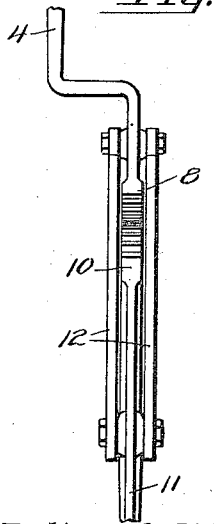
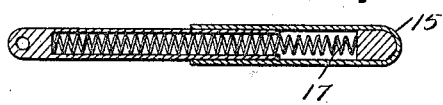

D. C. WATT & F. A. GREARSON.
VEHICLE TOP RAISING AND LOWERING MECHANISM.
APPLICATION FILED NOV. 10, 1913.
1,144,925.
Patented June 29, 1915.
5 SHEETS—SHEET 4.
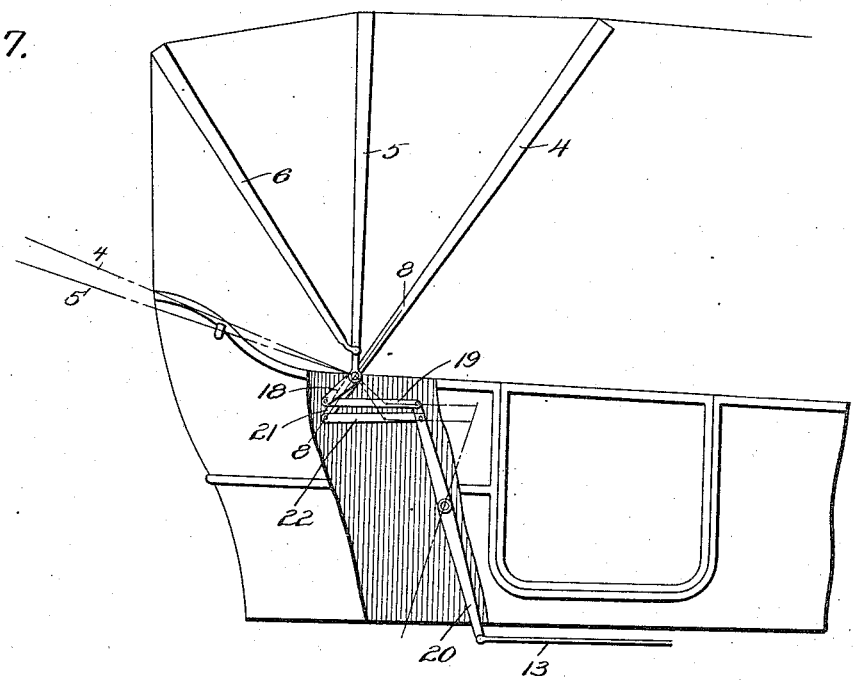
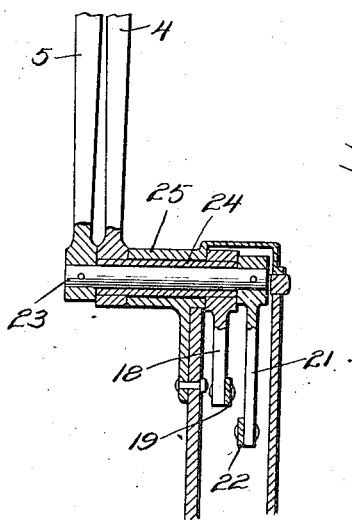
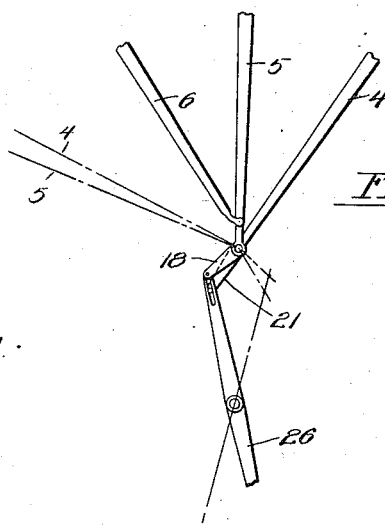
Inventors
Delton C. Watt.
Frederick A. Grearson.
Witnesses
F. C. Gibson.
V. B. Hillyard.
By Victor J. Evans
Attorney

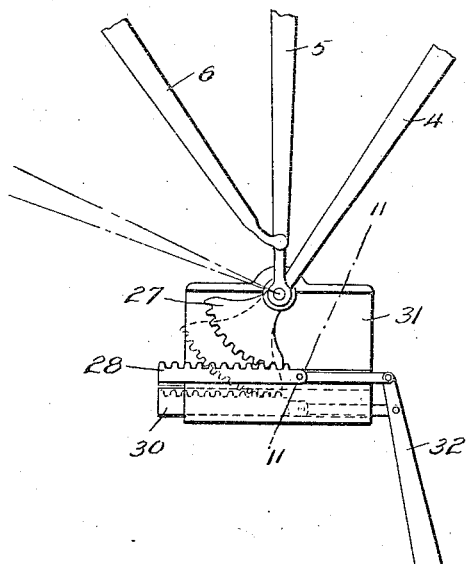
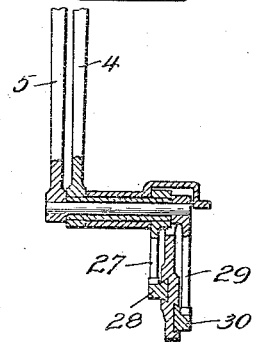
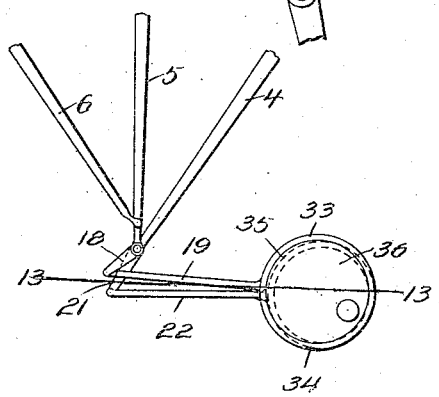
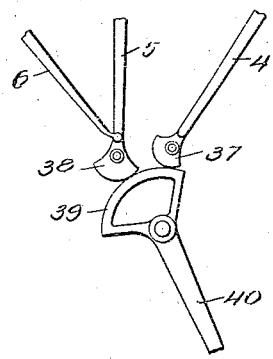
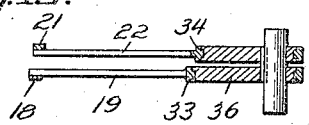

UNITED STATES PATENT OFFICE.

DELTON C. WATT AND FREDERICK A. GREARSON, OF BARRE, VERMONT.

VEHICLE TOP RAISING AND LOWERING MECHANISM.

1,144,925.   Specification of Letters Patent.   Patented June 29, 1915.

Application filed November 10, 1913. Serial No. 800,133.

*To all whom it may concern:*

Be it known that we, DELTON C. WATT and FREDERICK A. GREARSON, citizens of the United States, residing at Barre, in the county of Washington and State of Vermont, have invented new and useful Improvements in Vehicle Top Raising and Lowering Mechanism, of which the following is a specification.

Operators and owners of motor vehicles have experienced the difficulty, inconvenience, annoyance and effort required to be expended when raising and lowering the top and as a result such top is left raised when otherwise it would be desirable to have the same lowered or is left lowered when it would be advantageous to have the same raised.

The present invention provides a vehicle top particularly designed for automobiles which may be raised or lowered with ease and despatch and without requiring the operator to leave the seat, said top folding into compact form when lowered without presenting any of the working parts so as to be in the way or detract from the neat and finished appearance of the machine.

The invention contemplates a mechanism embodying an operating part such as a lever which is located within convenient reach of the driver's seat to admit of the top being operated when it is required to raise or lower the same, the operating mechanism embodying novel transmitting means whereby the bows or supports of the top are moved at different relative speeds to insure proper opening or closing of such bows or supports when the top is raised or lowered.

The invention consists of the novel features, details of construction and combination of parts, which hereinafter will be more particularly set forth, illustrated in the accompanying drawings, and pointed out in the appended claims.

Referring to the drawings forming a part of the specification, Figure 1 is a view of an automobile provided with a top equipped with raising and lowering mechanism embodying the invention. Fig. 2 is a central longitudinal section of the vehicle body and top showing the parts on a larger scale. Fig. 3 is a view of the parts illustrated in Fig. 2 showing the top lowered. Fig. 4 is a plan view of the parts shown in Fig. 2, the cover of the top being omitted. Fig. 5 is a detail section on the line 5—5 of Fig. 2. Fig. 6 is a front view of the operating mechanism at one side of the top showing the parts on a larger scale. Fig. 7 is a side view of a modification. Fig. 8 is an enlarged section on the line 8—8 of Fig. 7. Fig. 9 is a detail view of a further modification. Fig. 10 is a side view of a still further modification. Fig. 11 is a detail section on the line 11—11 of Fig. 10. Fig. 12 is a detail view of a still further modification. Fig. 13 is a detail section on the line 13—13 of Fig. 12. Fig. 14 is an enlarged section on the line 14—14 of a side member of the forward extensible frame. Fig. 15 is a further modification.

Corresponding and like parts are referred to in the following description and indicated in all the views of the drawings, by the same reference characters.

It is to be understood that the invention is adapted for vehicle tops generally but is of special advantage in connection with the tops of motor vehicles such as automobiles since it provides means whereby the top may be quickly, conveniently and easily raised or lowered without requiring the operator to leave the seat. The drawings hereto attached illustrate the invention in connection with the top of an automobile but the invention is not restricted to such application.

The numeral 1 designates the vehicle body which may be of any make or design, the same being provided with a foldable top which comprises a cover 2 which is fixed at its rear end to the vehicle body; and a plurality of bows or like supports. In the event of the top being designed for a vehicle having front and rear seats the forward portion of the top is supported by means of a bow 3 which is adapted to have its side members detachably connected with the ends of the front seat or other part of the vehicle body in any well known manner. This is essential because when the top is folded or lowered the front bow 3 is carried rearward in a manner well understood. The rear portion of the cover is supported by means of bows 4, 5 and 6. The bow 6 has its side members pivotally connected to the side members of the bow 5. The bows 4 and 5 are pivotally connected to the ends of the rear seat or to parts of the vehicle body and are constructed in such a manner as to coöperate with actuating means whereby the top may be raised or lowered. A lazy tongs 7 connects the horizontal portions of the bows 4, 5 and 3 to cause such parts to move when the operating means are set in motion to effect raising or lowering of the top. The relative position of such lazy tongs is immaterial so long as the result to be accomplished is attained namely the carrying forward or rearward of the front bow or support 3. It is of course to be understood that the bows 4 and 5 are the power members to serve as the prime movers of the lazy tongs 7 which operates to extend the cover.

In the construction shown in Fig. 1 and the detail views thereof the bows 4 and 5 are provided at the lower ends of their side members with toothed sectors 8 and 9 which match with toothed sectors 10 at the upper ends of levers 11 which are pivoted between side plates 12 at the ends of the rear seat or at opposite sides of the vehicle body. The toothed sectors 8 are of less diameter than the toothed sectors 9, hence the movement of the bow 4 is proportionately faster than the travel of the bow 5, this being essential to admit of the proper lowering and raising of the top. In order to obtain a substantial and durable structure the sectors 8 and 9 are pivotally mounted between the plates 12. The arrangement of the parts is such as to avoid interference and to prevent any part of the top operating mechanism detracting from the appearance of the machine or vehicle. The rods 13 extend along said sides of the vehicle body and preferably below the same so as to be out of the way and are connected at their rear ends with the lower ends of the levers 11 and at their front ends with an operating lever 14 or like part arranged within convenient reach of the driver's seat so as to be readily accessible when it is required to raise or lower the top.

The front portion of the cover is supported by means of a frame 15 which is substantially U-form and has its side members pivotally connected to the side members of the front bow 3. The frame 15 is held in horizontal position by means of folding braces 16 such as commonly provided between the bows of folding vehicle tops. The frame 15 is extensible and comprises sectional side members which have a telescopic arrangement and between which expansible springs 17 are interposed. When the top is lowered or folded, as indicated most clearly in Fig. 3, the braces 16 have their joints broken and the frame 15 is contracted by pressing the front portion inward, such frame folding upon the bows and being secured in any manner, the front portion of the cover serving as a protector for the remaining portion of the cover.

In the modification shown in Figs. 7 and 8 the bow 4 has its side members provided with extensions 18 which are connected by means of links 19 with the upper ends of side levers 20. The bows 5 have their side members provided with extensions 21 which are connected by means of links 22 with the side levers 20 a short distance from the upper ends of such levers. The lower ends of the side levers 20 are adapted to be connected by means of rods 13 with an operating lever or like part 14 in the manner hereinbefore described. The construction is such as to insure a differential movement of the two bows 4 and 5 for the purpose herein stated. As shown most clearly in Fig. 8 the side members of the bow 5 are secured to shafts 23, said shafts having arms 21 fastened thereto and constituting the extensions. The side members of the bow 4 are secured to hollow shafts 24 which are mounted upon the shafts 23 and in turn are journaled in bearings 25 at the upper ends of brackets secured to the sides of the vehicle body. Arms 18 forming the extensions are secured to the inner ends of the hollow shafts 24.

In the construction shown in Fig. 9 the bows 4 and 5 have extensions 18 and 21 which are connected to the upper ends of the side levers 26, the connection being such as to admit of a relative play between the parts when the levers 26 are operated to effect a lowering or a raising of the top.

In the modification shown in Figs. 10 and 11 the side members of the bow 4 are provided with toothed sectors 27 which are in mesh with rack bars 28. The side members of the bow 5 have toothed sectors 29 connected therewith and in mesh with the rack bars 30. The rack bars 28 and 30 are mounted in suitable guides provided upon opposite sides of a plate 31 and are connected by means of links with upper ends of levers 32 at the sides of the vehicle. The toothed sectors 27 and 29 have connection with the respective bows in a manner similar to the extensions 18 and 21 described in connection with Fig. 8.

The modification shown in Figs. 12 and 13 is substantially the same as shown in Fig. 9, the bows having their side members provided with extensions 18 and 21 which are connected by means of links 19 and 22 with eccentric straps 33 and 34 mounted upon eccentrics 35 and 36, said eccentrics being operable in any manner to effect a movement of the bows when raising or lowering the top.

The bows 4 and 5 of the modified form shown in Fig. 15 are provided at their lower ends with sectors 37 and 38 which engage with a sector 39 at the upper end of a lever 40. The elements 37, 38 and 39 engage frictionally. In this connection it is to be understood that within the purview of the invention it is proposed to connect the bows and operating levers in any manner to cause positive movement of the parts to insure a raising or a lowering of the top when the predetermined actuating element is operated.

From the foregoing description, taken in connection with the accompanying drawings, the advantages of the construction and of the method of operation will be readily apparent to those skilled in the art to which the invention appertains, and while we have described the principle of operation of the invention, together with the device which we now consider to be the best embodiment thereof, we desire to have it understood that the device shown is merely illustrative, and that such changes may be made when desired as are within the scope of the claims appended hereto.

Having thus described the invention what is claimed as new, is:—

1. The combination with an extensible cover forming a foldable top for a vehicle, and adapted to have one end fixed to the vehicle body, of a power member forming one of the supports for the cover and spaced from its fixed end, a movable support between the power member and the fixed end of the cover, expansible means connected with the power member and the support, and means for operating the power member to distend the expansible means whereby the latter together with said power member and movable support will be in relative position for holding the cover raised and taut from end to end thereof.

2. In combination with a vehicle top embodying pivoted bows or like supports for the cover, said bows having extensions of their side members projecting to unequal distances and side levers having connection with the extensions of the bows unequal distances from the fulcra of such side levers, whereby the bows have a differential movement imparted thereto in the raising and lowering of the top.

3. In a folding vehicle top, a front frame of substantially U-form for supporting the forward portion of the top cover, said frame embodying extensible hollow telescopic side members which are pivoted to the front bow, and springs coöperating with and disposed within the hollow telescopic side members of the frame to effect a yielding movement thereof.

In testimony whereof we affix our signatures in presence of two witnesses.

DELTON C. WATT.
FREDERICK A. GREARSON.

Witnesses:
V. B. HILLYARD,
I. M. BIGELOW.